Oct. 24, 1933.  A. DINA  1,932,205
RESILIENT POWER TRANSMISSION DEVICE
Filed Jan. 23, 1930   2 Sheets-Sheet 1
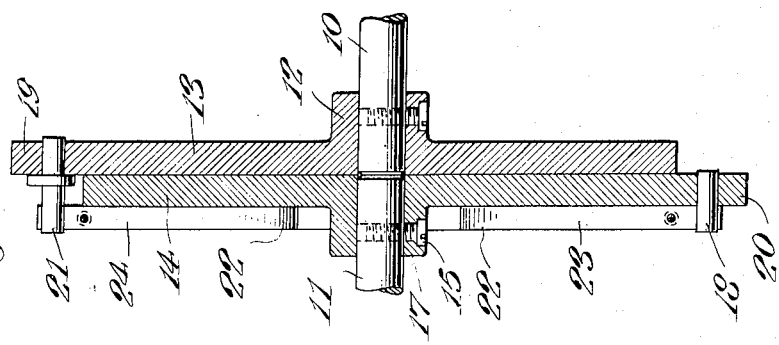
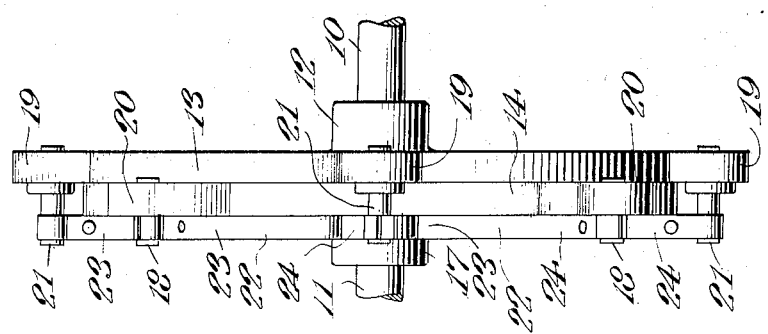
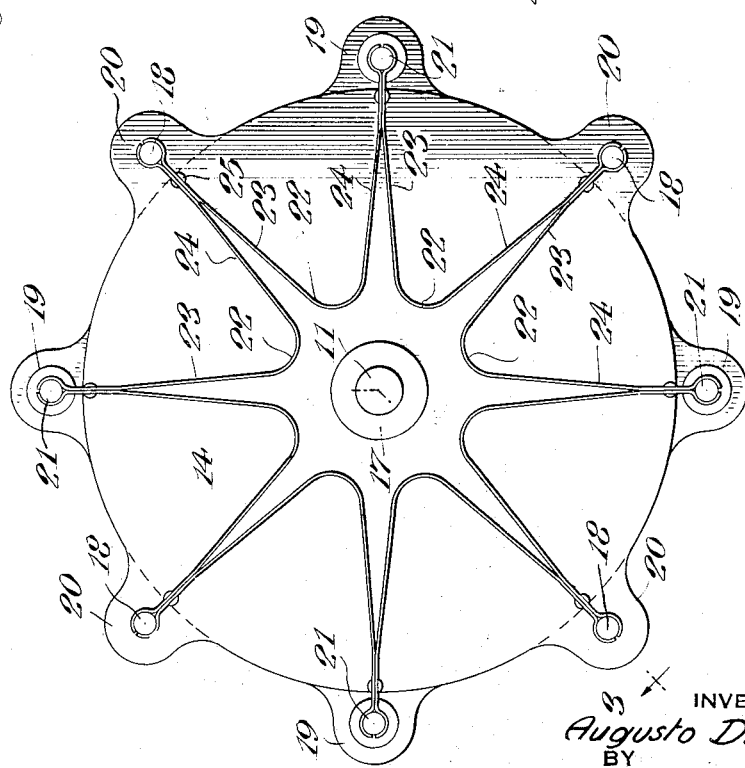
INVENTOR
Augusto Dina
BY
Howard W. Dix
ATTORNEY Oct. 24, 1933.  A. DINA  1,932,205
RESILIENT POWER TRANSMISSION DEVICE
Filed Jan. 23, 1930  2 Sheets-Sheet 2

INVENTOR
Augusto Dina
BY
Howard W. Dix
ATTORNEY

Patented Oct. 24, 1933

1,932,205

UNITED STATES PATENT OFFICE 1,932,205

RESILIENT POWER TRANSMISSION DEVICE

Augusto Dina, Elizabeth, N. J., assignor to International Projector Corporation, New York, N. Y., a corporation of Delaware Application January 23, 1930. Serial No. 422,712

3 Claims. (Cl. 64—96)

This invention relates to a new and improved driving coupling, and has for a main object the provision of a simple, durable, compact, and efficient device whereby power is readily transmitted from a drive member to a driven member with extreme smoothness and flexibility at all times and without any sudden jars or strains or disturbing vibrations so that the driven elements or mechanism will be completely protected from said disturbances and will be operated efficiently and smoothly.

A further object is to provide a coupling which can be readily put into operative condition and position between the driving and driven members and can be readily replaced and repaired when desired with a minimum of disturbance of the operation of the power transmission.

A still further object is to provide a device in which the desired flexibility of the flexible drive can be adjusted to exactly the desired degree and with a minimum of cost and effort.

Further and more specific objects, features, and advantages will more clearly appear from the detailed description given below when taken in connection with the accompanying drawings which form part of the specification and which illustrate one present preferred form of the invention.

In general terms the invention may be said to include the use of a spring element disposed between the driving member and the driven member. This spring member is in the form of a leaf spring or springs and in the preferred form illustrated and described herein, one portion of the coupling has a somewhat zig-zag or wave formation with alternate peaks and depressions familiar in such formations and in one form thereof shaped somewhat like a star. The element is preferably made up of a plurality of leaf springs bent into a shape like a U with their limbs connected to form the peaks of the formation and these points of connection are alternately connected to the driving and the driven members. The element may be disposed adjacent to or between plates connected to the driving and the driven members or otherwise associated therewith as may be desired.

The present preferred form of the invention is shown in the drawings in which,

Fig. 1 is a front elevation of the preferred form of the invention;

Fig. 2 is a side elevation thereof;

Fig. 3 is a vertical cross section taken on the line 3—3 of Fig. 1;

Figure 4:
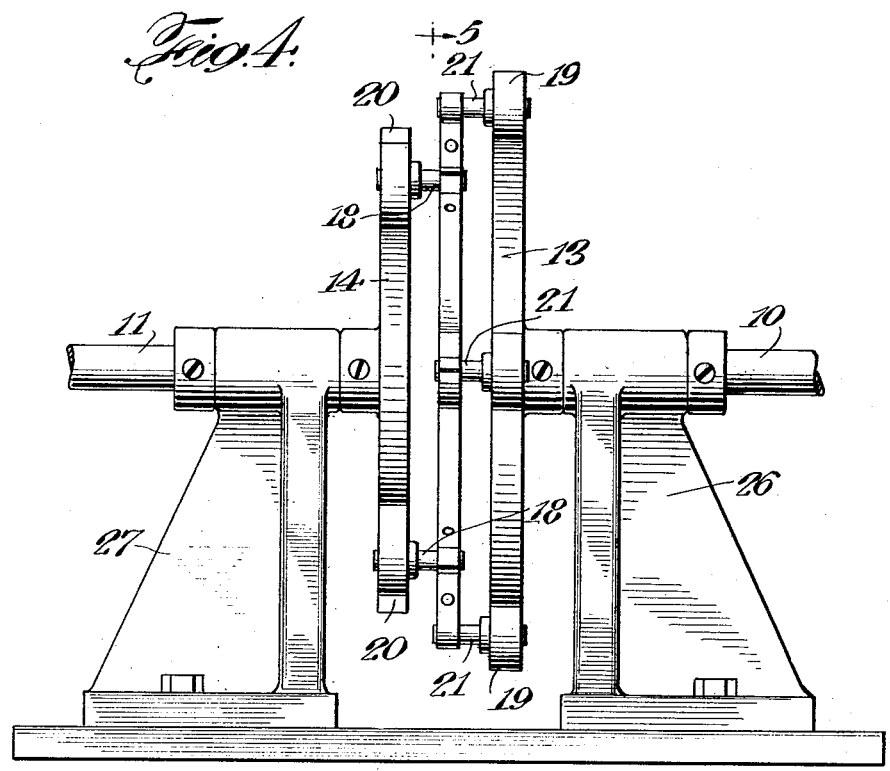
Fig. 4 is a side elevation of a modified form of the invention.

As shown in the drawings, the preferred form of the invention comprises a driving mechanism including a drive shaft 10 and a driven shaft 11. Of course this relation may be reversed. The shaft 10 is preferably connected to a hub 12 on a drive plate 13.

Adjacent the plate 13 is another plate 14 suitably fastened as by a key 15 to the driven shaft 11. The plate 14 is preferably held in juxtaposition adjacent the plate 13 by means of the collar 17 or hub on the plate and fastened to the shaft 11.

The plate 14 is provided with a plurality of spaced pins such as 18 along its periphery and on the side opposite the plate 13. The plate 13 is provided with a plurality of outstanding ears or suitable projections such as 19 which correspond to ears 20 disposed at spaced intervals along the periphery of the plate 14 and which ears 19 and 20 are sequentially spaced with relation to each other on the two plates 13 and 14. The pins 18 are fastened to the ears 20 and the pins 21 are fastened to the ears 19.

Disposed adjacent the plate 14 on the side opposite the plate 13 there is found a spring coupling member. In this instance it has a zig-zag or wave formation or construction and is made up of a plurality of separate spring elements such as leaf springs each having a bent U-shaped middle section such as 22 and limbs 23 and 24. While the main essence of the shape of this spring element is that it is a leaf shape as to its elements, the preferred form is wave shaped and the particular form shown is such that the respective limbs 23 of each leaf spring are connected to the limbs 24 of the adjacent leaves near their outer ends by any suitable means such as rivets 25. Preferably the limbs extend slightly beyond this point of connection and are formed as by being bent or curved to form spring like resilient pockets to receive the pins 21 and 18.

It is to be observed that the pins 18 are engaged with alternate connected limbs 23 and 24 and that the pins 21 are connected to the other and alternate joined limbs as indicated in the drawings. Thus there is provided between the plates 13 and 14 a flexible coupling of such nature as if a plurality of leaf springs were disposed therebetween and this effect is achieved by means of the leaf springs and their connections to the pins 18 and 21. The flexibility of the spring leaves may be varied by increasing the length of the limbs or by increasing the cross sectional area of each limb for a given radius or by decreasing the radius for a given cross sectional area of limb. It is found that the flexibilty of the limbs or spring elements varies substantially inversely as the cube of the cross sectional area.

Figure 5:
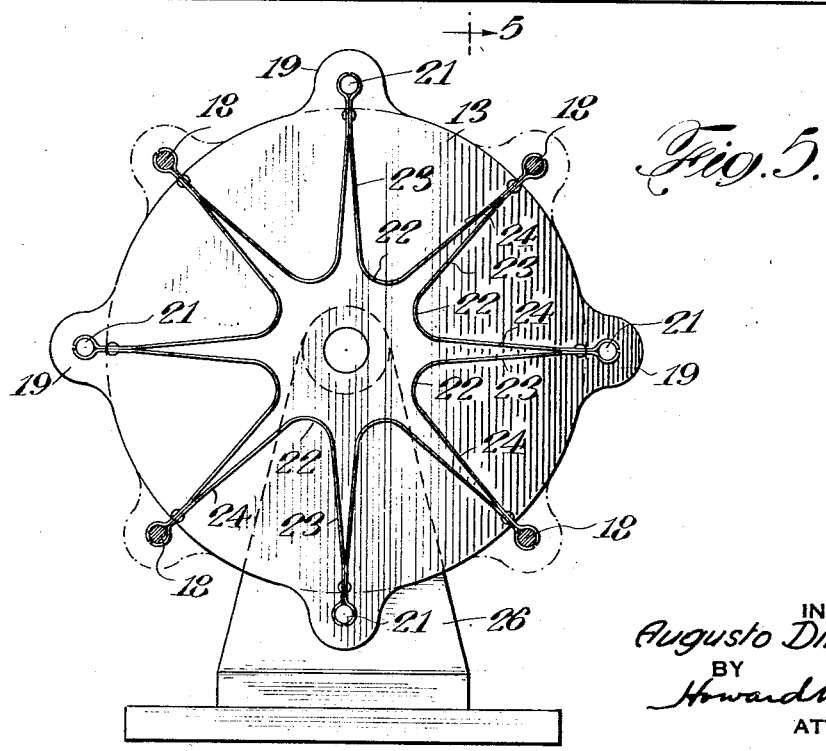
Fig. 5 is a vertical cross section taken on the line 5—5 of Fig. 4.

If desired the spring element or coupling may be disposed between the driving and driven shafts and this sort of modification of the invention is shown in Figs. 4 and 5 in which the drive shafts are as before with the plates 13 and 14 now spaced considerably apart. The shaft 10 is supported in a suitable journal 26 and the shaft 11 in a suitable journal 27. In this form the pins 21 on the plate 13 project toward the plate 14 and the pins 18 on the plate 14 project toward the plate 13 and engage as before with respective alternate joined limbs 23 and 24 as above described, the spring element being disposed between the plates. This arrangement may be enclosed by any suitable means, not shown, if desired.

Thus it is apparent that the device is simple, compact, durable, and extremely flexible for the smooth transmission of power between the two shafts. The spring element may be readily removed to be replaced or repaired and can be readily inserted in most any power transmission line without any great degree of trouble or expense. It is also a ready matter to remove the elements for replacement with another one having a different degree of flexibility when desired.

While the invention has been described in detail and with respect to a present preferred form thereof, it is not to be limited to such details and forms since many changes and modifications may be made and the invention embodied in other forms and modifications without departing from the spirit and scope of the invention in its broadest aspects. Hence it is desired to cover any and all forms and modifications coming within the language or scope of any one or more of the appended claims.

What is claimed, is,

1. A flexible coupling comprising plates disposed closely adjacent each other, aligned shafts on which said plates are mounted, widely spaced pins on each plate and extending therefrom in the same direction, the pins of one plate disposed alternately with the pins of the other plate, a star-shaped spring leaf unit connected to said pins and lying on the same side of both plates, said unit comprising a plurality of U-shaped spring elements connected respectively along their limb portions to corresponding portions of similar adjacent elements, the U-shaped intermediate portions of the several elements lying on the same side of the line of connection of the elements, the pins on one of said plates being connected to alternate points of connection with said spring, and the pins on the other plate being connected to other alternate points of connection of said spring unit.

2. A flexible driving coupling comprising a pair of substantially flat smooth plates disposed closely adjacent each other, aligned shafts supporting said plates, widely spaced pins projecting from said plates, the pins of one plate staggered with respect to the pins on the other plate, a spring unit comprising a plurality of U-shaped spring elements positively connected respectively along their limb portions to corresponding portions of similar adjacent spring elements, said spring unit positioned to lie on the same side of both plates, the pins of one plate connected to alternate points of connection with said spring elements, and the pins on the other plate connected to other alternate points of connection of said spring elements.

3. A flexible driving coupling comprising a pair of substantially flat smooth plates disposed adjacent each other, widely spaced pins projecting outwardly from said plates, the pins of one plate staggered with respect to the pins on the other plate, a coupling element comprising a plurality of U-shaped spring elements positively connected respectively along their limb portions to corresponding portions of similar adjacent elements, said spring elements lying on the same side of both plates, the pins of one plate being connected to alternate points of connection of said spring element and the pins of the other plate being connected to other alternate points of connection of said spring element.

AUGUSTO DINA.